United States Patent
Kollati et al.

(10) Patent No.: US 11,446,596 B2
(45) Date of Patent: Sep. 20, 2022

(54) SELF REFRESHING PARTICLE SEPARATOR

(71) Applicant: HONEYWELL INTERNATIONAL INC., Morris Plains, NJ (US)

(72) Inventors: Vighneswara Rao Kollati, Hyderabad (IN); Yogendra Sheoran, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 276 days.

(21) Appl. No.: 16/653,682

(22) Filed: Oct. 15, 2019

(65) Prior Publication Data

US 2021/0108567 A1    Apr. 15, 2021

(51) Int. Cl.
| | |
|---|---|
| *B01D 45/00* | (2006.01) |
| *B01D 45/08* | (2006.01) |
| *F02C 7/052* | (2006.01) |
| *F02C 7/30* | (2006.01) |
| *F01D 25/32* | (2006.01) |
| *B01D 45/04* | (2006.01) |
| *B64D 33/02* | (2006.01) |

(52) U.S. Cl.
CPC ............ *B01D 45/08* (2013.01); *B01D 45/04* (2013.01); *F01D 25/32* (2013.01); *F02C 7/052* (2013.01); *F02C 7/30* (2013.01); *B01D 2279/60* (2013.01); *B64D 2033/0246* (2013.01)

(58) Field of Classification Search
CPC ......... F01D 25/32; B01D 45/00; B01D 45/04; B01D 45/08
See application file for complete search history.

(56) References Cited

U.S. PATENT DOCUMENTS

| | | | |
|---|---|---|---|
| 3,405,511 A | 10/1968 | Halter et al. | |
| 4,198,219 A | 4/1980 | Krisko | |
| 4,704,145 A | 11/1987 | Norris et al. | |
| 5,104,431 A * | 4/1992 | Fewel, Jr. | ............... B01D 45/08 55/440 |
| 7,297,260 B2 * | 11/2007 | Hjerpe | .................... B08B 9/093 210/251 |
| 9,546,603 B2 | 1/2017 | Meier et al. | |
| 2016/0045847 A1 | 2/2016 | Kuennen | |
| 2019/0226362 A1 | 7/2019 | Kollati et al. | |

FOREIGN PATENT DOCUMENTS

| | | |
|---|---|---|
| BE | 867741 A | 10/1978 |
| CN | 106268050 A | 1/2017 |
| EP | 3150826 A1 | 4/2017 |
| EP | 3513859 A1 | 7/2019 |
| GB | 288992 | 11/1928 |

(Continued)

*Primary Examiner* — Robert A Hopkins
(74) *Attorney, Agent, or Firm* — Lorenz & Kopf, LLP

(57) ABSTRACT

A particle separator includes a housing through which a flow stream is directed. A number of guide vanes are disposed in the housing. The guide vanes have a profile wherein the flow stream is guided to follow the profile. The guide vanes have a wall surrounding an open interior that defines a vane plenum. A plurality of through-holes extend through the wall of the guide vane. The through-holes are open to the flow stream and to the vane plenum. A duct connects with the vane plenum and is configured to discharge particles collected in the vane plenum.

20 Claims, 7 Drawing Sheets

(56) References Cited

FOREIGN PATENT DOCUMENTS

| | | |
|---|---|---|
| GB | 421888 | 12/1934 |
| GB | 1449186 | 9/1976 |
| JP | S61250324 A | 7/1986 |
| JP | 2005252100 A | 9/2005 |
| JP | 2017072132 A | 4/2017 |

\* cited by examiner

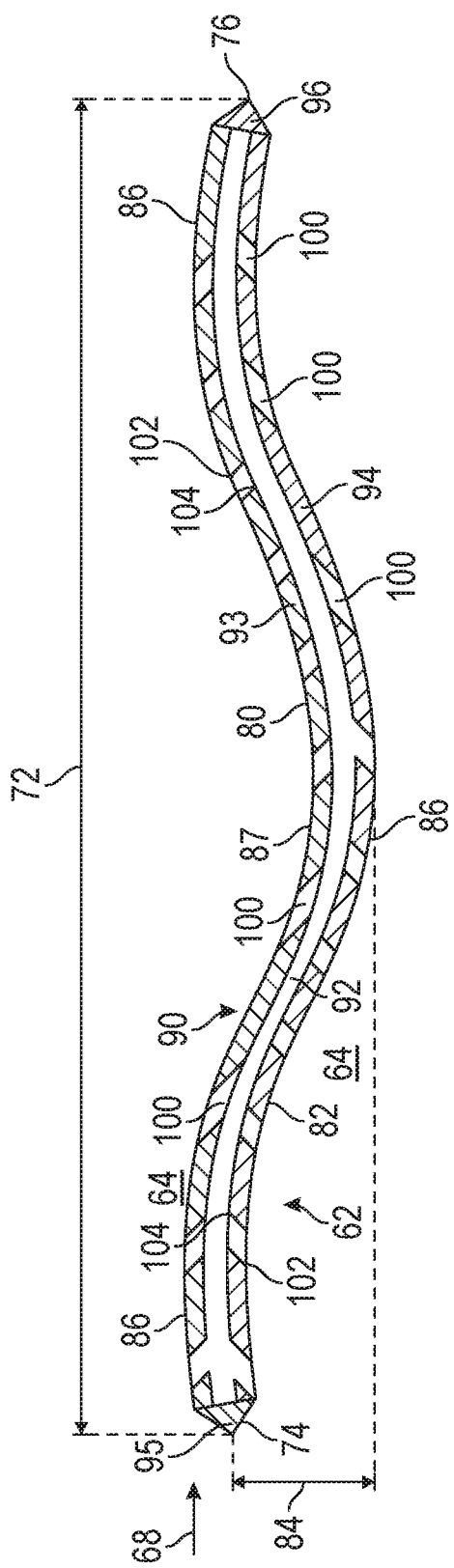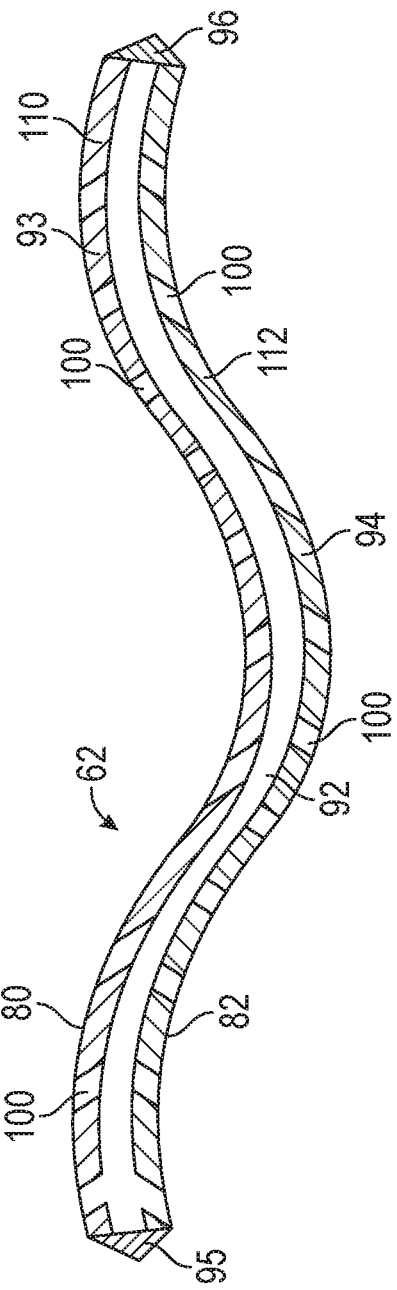

SELF REFRESHING PARTICLE SEPARATOR

TECHNICAL FIELD

The present invention generally relates to particle separation systems, and more particularly relates to particle separators that are self refreshing without a need for cleaning downtime.

BACKGROUND

The separation of particles from a fluid stream is desirable in a variety of systems. One such system involves the use of a gas turbine engine. A gas turbine engine may be employed to power various devices, mobile or stationary. For example, a gas turbine engine may be employed as a power source in an aircraft. Certain operating environments, such as dry or dusty operating environments, may create conditions that cause the gas turbine engine to ingest fine sand and dust particles. These ingested particles may pass through portions of the gas turbine engine eroding low temperature components, corroding high temperature components, and may accumulate in stagnation regions of cooling circuits within turbine components, such as those in turbine airfoils associated with the gas turbine engine. The ingestion of particles may affect operation efficiency and may reduce the lifespan of components such as the turbine airfoil or combustor, leading to increased repair costs and downtime for the gas turbine engine.

Accordingly, it is desirable to effectively remove ingested particles. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a particle separator includes a housing through which a flow stream is directed. A number of guide vanes are disposed in the housing. The guide vanes have a profile wherein the flow stream is guided to follow the profile. The guide vanes have a wall surrounding an open interior that defines a vane plenum. A plurality of through-holes extend through the wall of the guide vane. The through-holes are open to the flow stream and to the vane plenum. A duct connects with the vane plenum and is configured to discharge particles collected in the vane plenum.

In a number of additional embodiments, a particle separator for an inlet duct includes a housing through which a flow stream is directed. A plurality of guide vanes are disposed in the housing, each of the guide vanes having a profile that the flow stream is guided to follow. Each of the guide vanes has a wall surrounding an open interior defining a vane plenum, with a plurality of through-holes extending through the wall connecting the flow stream with the vane plenum. A common plenum is defined by the housing and each of the vane plenums is open to the common plenum. A scavenge duct is connected with the common plenum to discharge particles collected in the vane plenums and to self-refresh the particle separator.

In a number of other embodiments, a particle separator is provided for an inlet duct that channels a flow stream. The particle separator includes a plurality of guide vanes aligned with one another and configured to separate the flow stream into multiple flow channels. The guide vanes each have a profile that the flow channels follow. Each flow channel has a zero line of sight so that the flow stream must turn in the flow channel. Each guide vane has a wall surrounding an open interior defining a vane plenum, with a plurality of through-holes extending through the wall of the guide vane connecting the flow stream with the vane plenum.

BRIEF DESCRIPTION OF THE DRAWINGS

The present invention will hereinafter be described in conjunction with the following drawing figures, wherein like numerals denote like elements, and wherein:

FIG. 4 is a detail, cross-sectional illustration of one guide vane of the particle separator of FIG. 2, according to an exemplary embodiment;

FIG. 5 is a schematic, cross-sectional illustration of one guide vane for use with the particle separator of FIG. 2, according to an exemplary embodiment;

DETAILED DESCRIPTION

Figure 1:
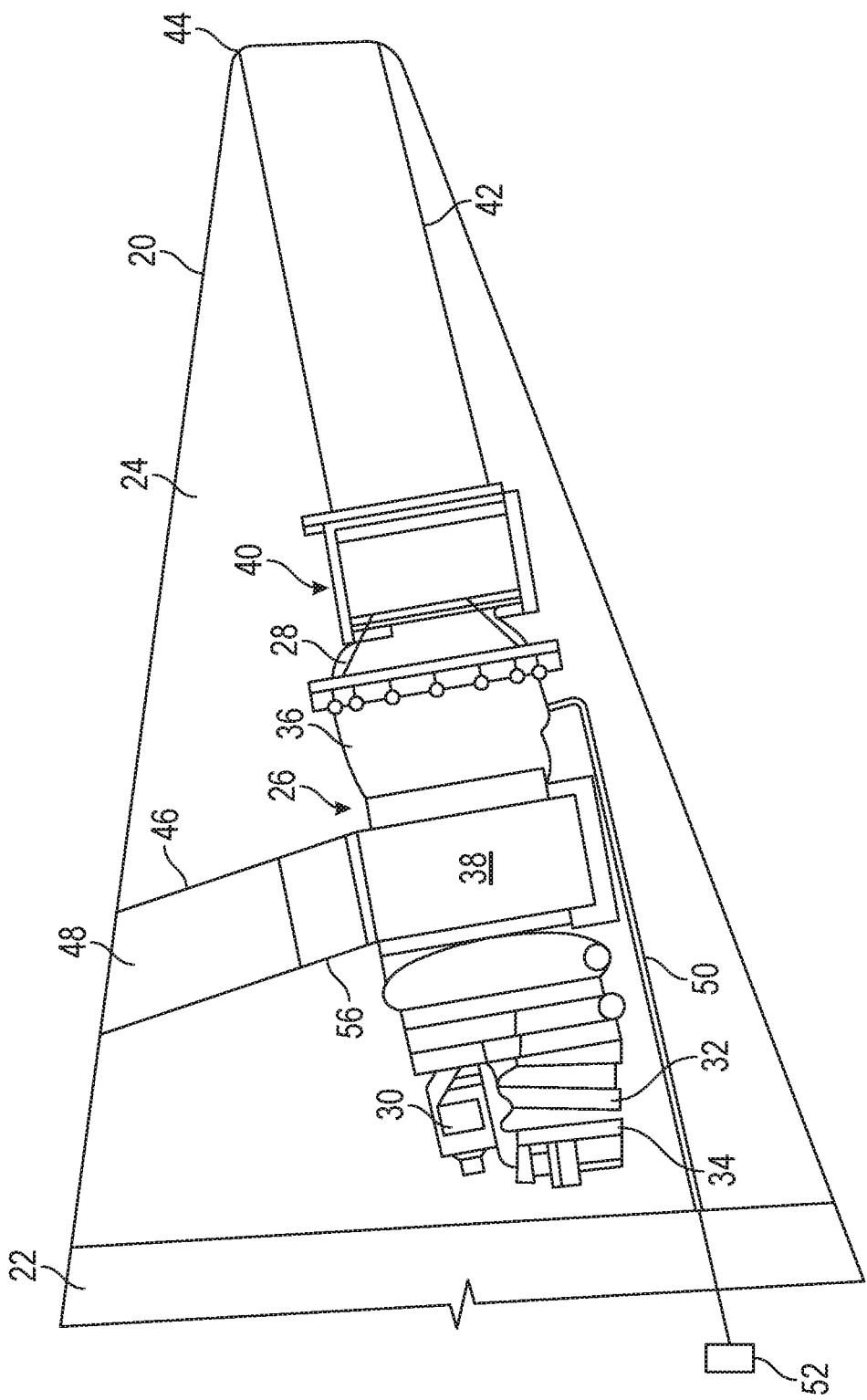
FIG. 1 is a cross-sectional illustration of a tail cone area of an aircraft including a gas turbine engine in an auxiliary power unit that includes a particle separator, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, a particle separator provides a mechanism of separating particles from a fluid stream. In an exemplary embodiment, a particle separator separates a variety of particles, including small particles (0-20 micron), from an inlet air stream by bringing particle laden air in contact with guide vanes, where particles are trapped and exhausted. As such, the guide vanes each include a series of through-holes that ingest particles for collection in an internal vane plenum. The guide vanes are designed to use the inertia of entrained particles to create impingement. The particle separator is a passive collection device which is readily actively refreshed. Unlike a barrier filter which restricts air flow and creates an increasing pressure drop as the system loads, when the particles such as dust and sand are collected, the pressure loss in the inlet system does not increase because the loading occurs sub-surface within the guide vanes, without obstructing the flow passages.

In an exemplary embodiments given herein, the particle separator may be associated with an auxiliary power unit (APU) system, but the disclosure is not limited in application to such systems. An APU system typically operates when an aircraft is on the ground, such as when parked at a terminal gate, and so particle separation is particularly useful. However, the current disclosure is applicable to other applications including propulsion engines and other non-engine systems, where particle separation from a fluid stream is desirable.

In an exemplary embodiment of the present disclosure as further described below, a particle separator includes a housing defining an inlet and an outlet, and through which a flow stream is directed. A number of dividers, which may be configured in the form of guide vanes, are provided in the housing separating flow channels from each other between the particle separator's inlet and outlet. The guide vanes each have an undulating profile and the flow channels follow the undulating profile. Other profiles that cause the flow stream to turn are also contemplated. Each guide vane has an interior vane plenum with through-holes providing openings between the flow stream and the vane plenum. Particle laden air enters the vane plenum through the through-holes and the particle are trapped. Air may exit the vane plenum through some of the through-holes, which may be strategically located and oriented to allow air out while retaining particles. A self-refreshing system may be used to unload particles from the vane plenums, without requiring downtime for cleaning.

As noted above, the particle separator system described herein may be employed in a variety of applications. By way of an exemplary embodiment presented for descriptive purposes, a gas turbine APU as illustrated in FIG. 1 is housed in the tail cone 20 area of an aircraft 22. The tail cone area 20 defines a compartment 24 that houses the APU 26. The APU 26 generally includes a turbine 28 which powers the APU 26, a starter 30 for starting the APU 26, a gearbox 32 for driving various loads including a generator 34 for supplying electrical power, a power compressor 38 for supplying air to the turbine 28, a combustor 36, an eductor system 40 for pumping air, and an exhaust duct 42 for delivering exhaust out of the tail 44 of aircraft 22. The compressor 38 receives outside air from an inlet duct 46 that extends between the APU 26 and an inlet opening 48. In the current embodiment, the opening 48 is presented through the side of the tail cone 20. The inlet opening may include a door that selectively opens when the APU 26 is in operation and is closed when the APU is not in use. In addition to supplying a main flow of combustion air to the turbine 28, the compressor 38 delivers, via a bleed system, compressed air for pneumatic powered systems 52 of the aircraft 22 through a supply duct 50. Accordingly, gas in the form of air is compressed by the compressor 38 and delivered for separate uses including by the combustor 36 and by the systems 52. The air supplied to the systems 52 is referred to as bleed air, which is separated from the main flow going to the combustor 36 internally in the compressor 38. Removing particles from the air used in the APU 26 is desirable to maintain efficient operation and to reduce wear on components.

Accordingly, in the current embodiment, the inlet duct 46 includes a particle separator unit 56, disposed to collect particles from the incoming air stream prior to reaching the compressor 38. The particles targeted for collection are generally sized in the range of 0-20 microns, although larger particles may also be captured. The compressor 38 operates most efficiently when the inlet pressure is as high as possible. Therefore, a barrier filter or other mechanism that creates a significant pressure drop in the inlet duct 46, or that diverts air prior to reaching the compressor, is not preferred. Instead, the particle separator 56 is employed to remove particles.

Figure 2:
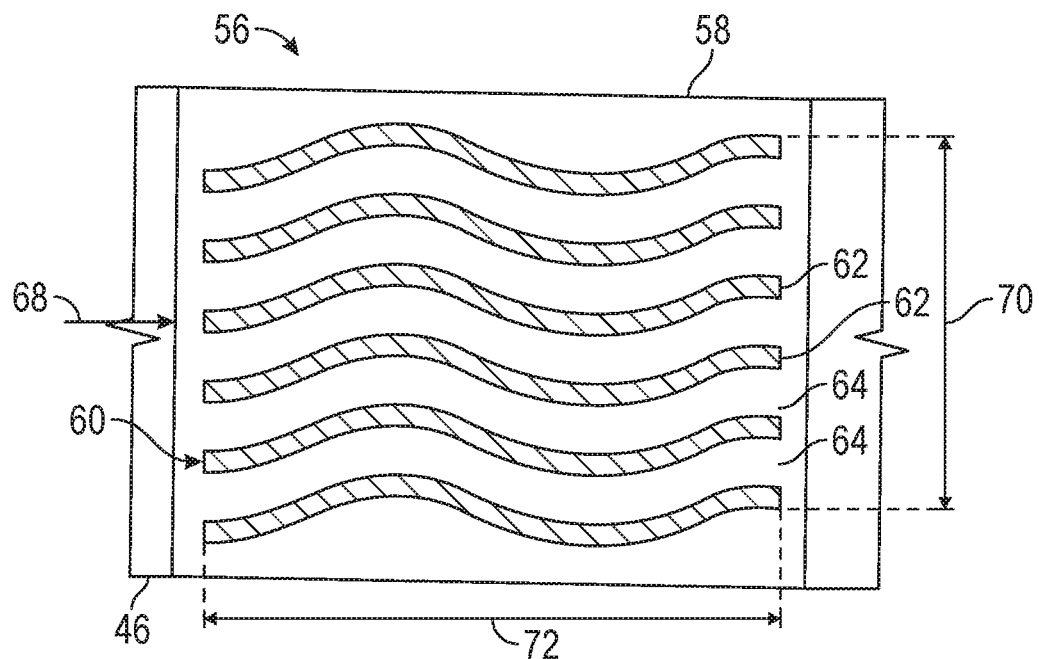
FIG. 2 is a schematic, cross sectional illustration of the particle separator area of the auxiliary power unit of FIG. 1, according to an exemplary embodiment.
Figure 3:
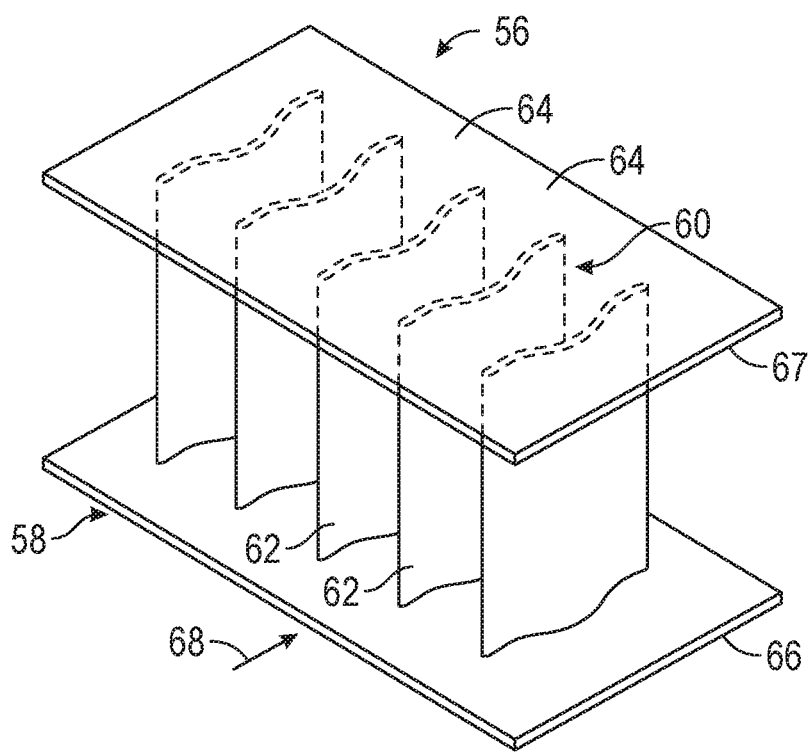
FIG. 3 is a schematic perspective illustration of the particle separator of FIG. 2, according to an exemplary embodiment.

With additional reference to FIGS. 2 and 3, the particle separator unit 56 includes a housing 58 sized to fit across the entire inlet duct 46 without a reduction in flow area size. The particle separator unit 56 is configured to collect particles passively as described in more detail herein, and has no need to divert any of the air flow out of the inlet duct 46. Instead, all incoming air flow is directed to the compressor 38. The particle separator unit 56 is configured to be readily self-refreshed. For example, a scavenging system may be used to exhaust collected particles, without increasing down time. The particle separator unit 56 may be held in place in the inlet duct 46 by conventional fasteners (not shown), may be configured to slide in and out of the inlet duct 46, and/or may be contained by other means.

The particle separator unit 56 includes a series of elements for dividing flow that are referred to collectively and generally as dividers 60, and in the current example are configured specifically as individual guide vanes 62. The guide vanes 62 are aligned with one another dividing the interior of the particle separator unit 56 to define a series of flow channels 64 generally disposed in the direction of the air flow stream 68 through the inlet duct 46 and the particle separator unit 56. The guide vanes 62 are generally in the form of plate-like structures that collectively have a width 70 normal to the direction of the air flow stream 68 sized to extend substantially completely across the particle separator unit 56, and a length 72 along the direction of the air flow stream 68 selected to provide a desired particle removal efficiency without creating a significant pressure drop. In the current embodiment, the air flow stream 68 has a velocity of about 36 meters per second. In the current example, the size is designed to create a negligible pressure drop across the particle separator unit 56. The number of guide vanes 62 is determined by their thickness and the size of the inlet duct 46 as further detailed below. As shown in FIG. 3, the assembly includes the guide vanes 62, each of which is connected to end plates 66, 67 forming a convenient assembly that is configured to be disposed in the inlet duct 46, and may be accessed through an access panel (not shown).

Referring to FIG. 4, an individual guide vane 62 is illustrated. The guide vane 62 extends along its length 72 from an upstream end 74 to a downstream end 76. In the current embodiment, the guide vane 62 is formed in an undulating, sinusoidal-like shape. It will be appreciated that the shape and the number of undulations may vary, and FIG.

Figure 8:
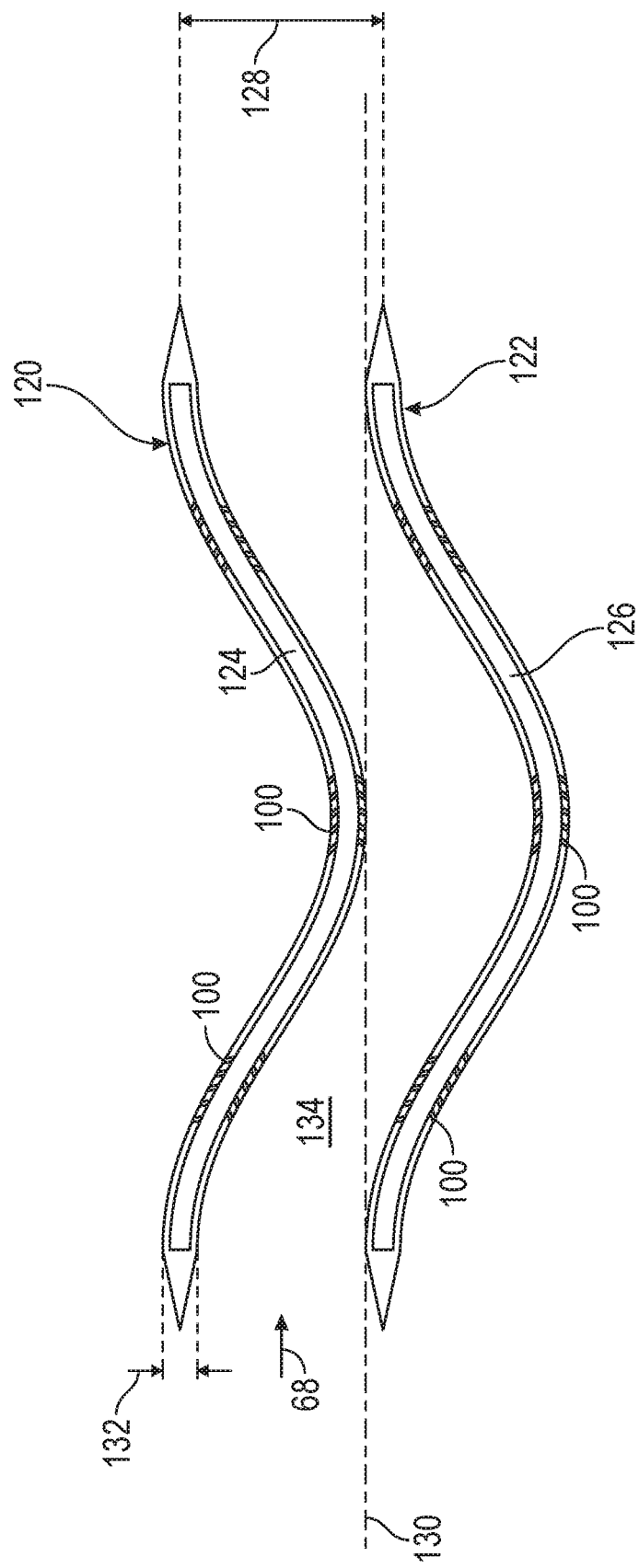
FIG. 8 is a schematic, cross-sectional illustration of vanes for the particle separator of FIG. 2, according to an exemplary embodiment.

4 is but one example of the possible configurations. In other embodiments, the guide vane 62 may have a different number of undulations or may take other shapes, the intent being to sufficiently redirect the air flow through the flow channels 64 to increase interaction of the guide vane 62 with the incoming dust laden air, and therefore to increase the occurrence of impingements and near impingements between the surfaces 80, 82 and dust particles. As the air flow stream 68 follows the surfaces 80, 82, particle capture is maximized due to inertia of the particles through the curving paths and their tendency to travel toward the guide vane 62 as the air stream turns. It should be noted that the guide vane 62 has a smoothly transitioning shape between undulations to minimize pressure drop which might otherwise be increased by sharp transitions such as those that would result from corners or conspicuous angles. The curved surfaces of the undulations create localized acceleration zones as the air flow stream 68 follows the surfaces 80, 82, in particular as the air rounds the outside of the peaks 86. As the air flows across the valley 87, its velocity slows, increasing the movement of particles toward the guide vane 62. In this embodiment, the distance of the offset 84 between the upstream end 74 and the peak 86 on an undulation is greater than the spacing (vane pitch 128 as shown in FIG. 8), between adjacent guide vanes 62 so that air cannot pass straight through the particle separator unit 56 without being turned by the guide vanes 62.

The guide vane 62 includes a wall structure 90 defining a vane plenum 92, which is an internal open space within the guide vane 62. The wall structure 90 includes side walls 93, 94 and end walls 95, 96 enclosing the vane plenum 92. The guide vane 62 includes a number of openings distributed across the surfaces 80, 82 and formed as through-holes 100 that extend through the walls 93, 94 so that each is open to the adjacent flow channels 64 and to the vane plenum 92. In this example, the through-holes 100 are inclined toward the incoming air flow stream 68 so that their inlet ends 102 are located upstream from their outlet ends 104. In this embodiment, air is exhausted from the vane plenum 92 through an exhaust path (such as described below), and therefore each inlet end 102 registers with the flow stream 68 and each outlet end registers with the vane plenum 92. In other embodiments, at least some of the through-holes 100 may be disposed and oriented so that air flows through them out of the vane plenum 92 and back to the air flow stream 68.

Figure 6:
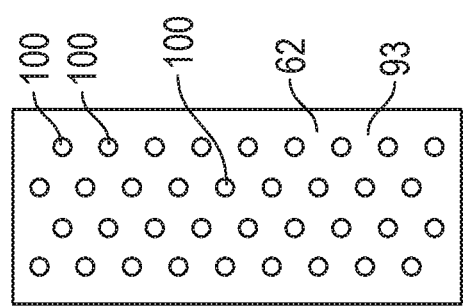
FIG. 6 is a schematic plan view of a side of a guide vane for use with the particle separator of FIG. 2, according to an exemplary embodiment.

As shown in FIG. 5, the through-holes 100 are distributed across the surfaces 80, 82 generally evenly over the entirety of the surfaces 80, 82. In the current embodiment, the through-holes 100 are generally cylindrical in shape with circular openings, however, other shapes are contemplated by the current disclosure including and a polygon or complex shape. In addition, other through-hole layout patterns are contemplated, the intent being to distribute the through-holes 100 on the surfaces 80, 82 to maximize interaction with the air flow stream 68 and to maximize capture of particles. FIG. 6 shows the plate 93 as viewed from its side. The through-holes 100 are arranged in rows longitudinally along the guide vane 62. The through-holes in adjacent rows are staggered relative to one another so as to not be aligned laterally. Non-alignment increase the efficiency of particle capture.

As illustrated in FIGS. 4 and 5, the guide vanes 62 of the current embodiment are constructed of two discrete plates mating together for simplicity of through-hole 100 formation. The guide vane 62 includes a plate 110 that forms the wall 93, with the perforations forming the through-holes 100. The plate 110 is disposed spaced from another plate 112 which forms the wall 94 and which is also perforated. The end walls 95, 96 may be formed as solid pieces joining the plates 110, 112 together to define the vane plenum 92. The plates 110, 112 and the end walls 95, 96 may be joined together by conventional means such as welding, adhesion, press fit, fasteners, or other means. The undulations may be formed either before or after the plates 110, 112 are joined. By forming the through-holes 100 in the plates 110, 112 prior to assembly, they may be readily created by operations such as piercing, stamping, or otherwise, and numerous shapes of the through-holes 100 may be made based on the shape of the forming tool. In other embodiments, the guide vane 62 may be made from a single contiguous piece of material with the through-holes 100 formed by casting, molding, boring or other manufacturing processes. Because the particle separator unit 56 of the current embodiment operates under exposure to ambient air, it may be constructed from a wide variety of materials including metals, polymers, composites, and others. In embodiments where the incoming gas stream is something other than air or is at an elevated temperature, a more durable material may be used.

Figure 7:
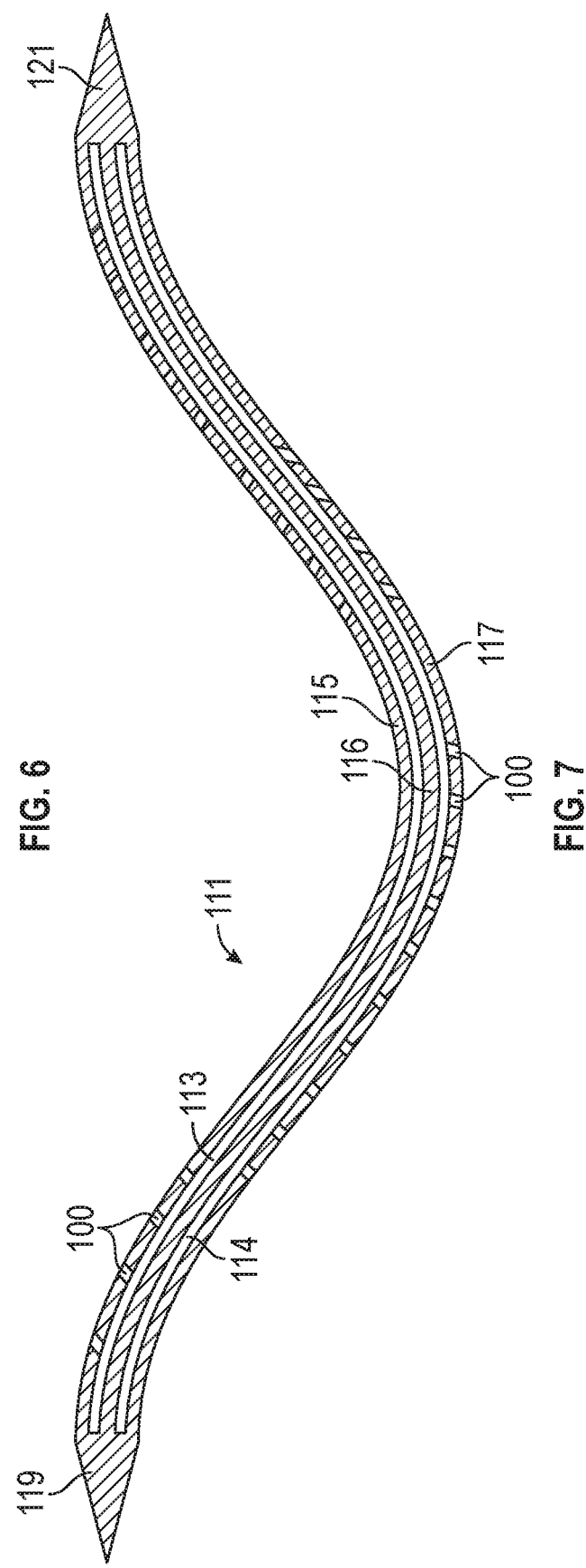
FIG. 7 is a schematic, cross-sectional illustration of one guide vane for use with the particle separator of FIG. 2, according to an exemplary embodiment.

As illustrated in FIG. 7, a guide vane 111 is illustrated with two vane plenums 113, 114. The guide vane 111 is constructed of three discrete plates mating together for simplicity of through-hole 100 formation. The guide vane 111 includes a plate 115 that forms an outside wall, with perforations forming the through-holes 100. The plate 115 is disposed spaced from another plate 116 which forms a center wall 117 between the vane plenums 113, 114. The plate 116 is free of perforations. The plate 116 is disposed spaced from another plate 117, which is also perforated with through holes 100. The end walls 119, 121 may be formed as solid pieces joining the plates 115, 116, 117 together to define the vane plenums 113, 114. The plates 115, 116, 117 and the end walls 119, 121 may be joined together by conventional means such as welding, adhesion, press fit, fasteners, or other means. The undulations of the guide vane 111 may be formed either before or after the plates 115, 116, 117 are joined. Providing two separated vane plenums 113, 114 simplifies orientation of the through-holes 100 for capture and retention of particles.

Referring to FIG. 8, a pair of guide vanes 120, 122 is illustrated in cross section along the air flow stream 68. Each through-hole 100 is formed through its respective wall thereby opening the air flow stream 68 to the vane plenums 124, 126. Spacing or vane pitch 128 between the guide vanes 120, 122 is set so that there is a zero line of sight 130 in the flow channels 134 between the guide vanes 120, 122. Zero line of sight 130 means that there is no direct straight path for the air flow stream 68 when passing through a flow channel in the area of the guide vanes 120, 122, but instead requires the air flow stream 68 to turn. Zero line of sight 130 maximizes interaction between the air flow stream 68 and the through-holes 100 to increase capture efficiency of particles. In some embodiments, the guide vanes 120, 122 may be disposed closer to one another than the maximum zero line of sight spacing, where a higher pressure drop is tolerable.

As illustrated in FIG. 8, vane thickness 132 is the thickness of the guide vane 120 at points away from the narrowed ends, and vane pitch 128 is the distance between the centers of adjacent guide vanes 62. The vane thickness 132 is selected to minimize pressure drop through the particle separator unit 56 and in this embodiment, is consistent along the length of the guide vane 120, except at the ends, which are narrowed for smooth air flow. The thickness 132 of the guide vanes 120, 122 and the total number of through-holes 100 may be tailored to maintain a negligible pressure drop through the particle separator unit 56 of less than one percent. In certain embodiments, the through-holes 100 have a diameter of 1-2 millimeters and the vane pitch 128 is 60 millimeters. The total number of guide vanes 62 and the total number of through-holes 100 may be balanced with resulting the pressure drop to achieve a desired particle capture rate with an acceptable pressure drop.

Figure 9:
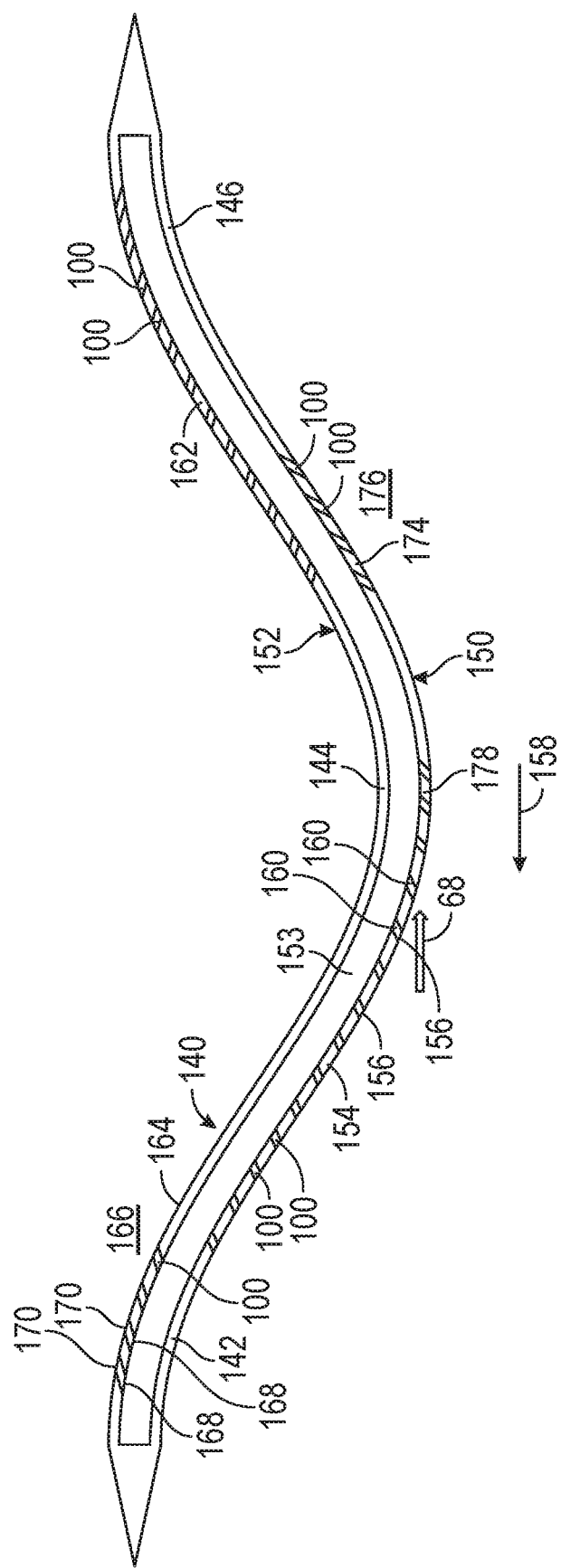
FIG. 9 is a schematic, cross-sectional illustration of a guide vane for the particle separator of FIG. 2, according to an exemplary embodiment.

Placement of the through-holes 100 may be strategically determined based on the direction of the air flow stream 68 and the shape of the guide vane 140. In the example of FIG. 9, the guide vane 140 has a sinusoidal-like shape with bends 142, 144, 146 formed by the walls 150, 152, which define the vane plenum 153. The bends 142, 144 result in a segment 154 of the wall 150 facing the oncoming air flow stream 68. The through holes 100 in the segment 154 are oriented so that their ends 156 are disposed in an upstream direction 158 relative to their ends 160. In this example, the ends 156 are disposed on the air flow stream 68 side of the wall 150 and the ends 160 are disposed on the vane plenum 153 side of the wall 150. This results in the through-holes 100 being inclined toward the oncoming air flow stream 68 to maximize particle capture and entry into the vane plenum 153. The through-holes 100 in the segment 162 in the area of the bend 146 of the wall 152 are similarly oriented for capture maximization and for air, with entrained particles, flow into the vane plenum 153.

The bend 142 results in a segment 164 of the wall 152 facing away from the oncoming air flow stream 68 creating a low pressure area 166 outside the wall 152. The through holes 100 in the segment 164 are oriented so that their ends 168 are disposed in an upstream direction 158 relative to their ends 170. In this example, the ends 168 are disposed on the vane plenum 153 side of the wall 152 and the ends 170 are disposed on the air flow stream 68 side of the wall 152. This results in the through-holes 100 being inclined away from the oncoming air flow stream 68 to facilitate air flow out of the vane plenum 153 to the low pressure area 166. The location of the through-holes 100 in the segment 164 is generally in the upstream direction 158 from the through-holes 100 in the segment 154. As a result, the particles entering through the segment 154 are unlikely to exit the vane plenum 153 with air exiting through the segment 164. A segment 174 of the wall 150 has through-holes 100 oriented similarly, for air flow out of the vane plenum 153 to a low pressure area 176. In general, the number of capture through-holes in the segments 154, 162 is substantially larger than the number of exit through-holes 100 in the segments 164, 174.

Figure 10:
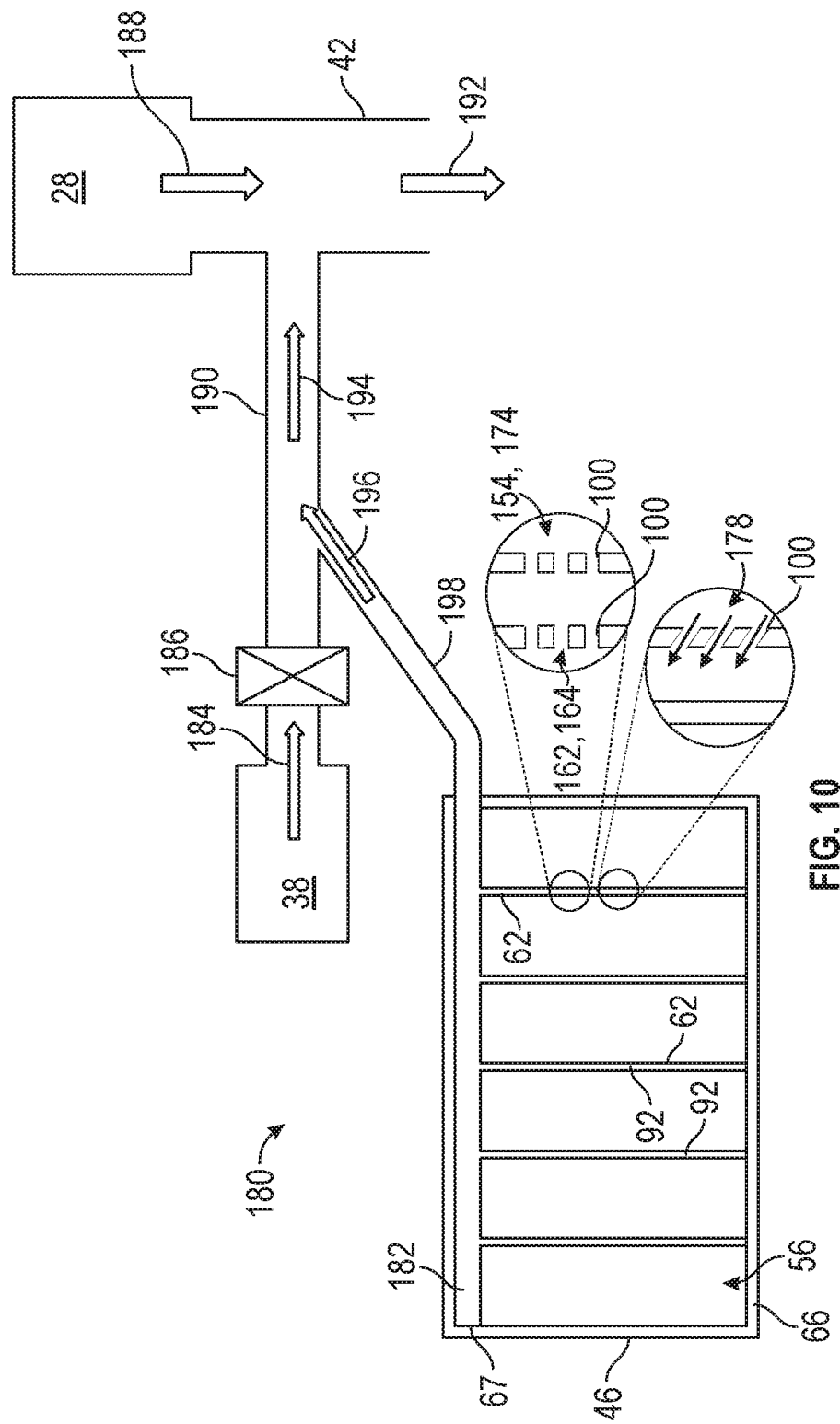
FIG. 10 is a schematic illustration of a particle separation system as viewed from the inlet, according to an exemplary embodiment.

In the area of the bend 150, and specifically in the segment 178 of the wall 154, a number of through holes 100 are oriented with a small upward inclination (from stream side to the vane plenum side) to the horizontal in addition to the inclination with the oncoming air stream as the through-holes 100 in the segment 154 are inclined. The incline is schematically shown in FIG. 10. This enables the through-holes 100 to act as incoming jets to direct particles within the vane plenum 153 away from the wall 150 to inhibit particles from escaping the vane plenum 153 out the through-holes 100 in the segment 174 just downstream of the bend 144. In addition, the through-holes 100 in the segment 178 help move particles towards a discharge mechanism as described below.

Referring to FIG. 10, one such discharge mechanism is illustrated in the form of a scavenging system 180. In the scavenging system 180, the particle separator unit 56 is disposed in the inlet duct 46 such as of the APU 26. The vane plenums 92 of the guide vanes 62 are open and connected with a common plenum 182 so that particles within the vane plenums 92 may move into the common plenum 182. As noted above, some of the through-holes 100 may be oriented to assist in particle movement to the common plenum 182. In this embodiment, the common plenum 182 is defined within the end plate 67. Air and particles may be drawn from the common plenum 182, and the vane plenums 92 by suction, which may be created by a number of mechanisms. In this example, surge air purge from the compressor 38 is used to draw air and particles. Surge is an unwanted phenomenon of operation of the compressor 38 and may be avoided or reduced by venting a portion of the compressor's discharge flow to maintain the compressor 38 at operating conditions away from its surge limit. In this example, the vented air 184 is controlled by a surge control valve 186 that controls flow out of the compressor 38 for entrainment with exhaust flow 188 from the turbine 28. Accordingly, flow in the surge duct 190 is intermittent and occurs when air is vented through the surge control valve 186 to avoid surge. When the surge control valve 186 is open, air moves from the compressor 38, through the surge duct 190 and is entrained in the exhaust flow 188 within the exhaust duct 42 for discharge 192. The surge flow 194 draws particle laden air flow 196 through a scavenge duct 198 connected between the common plenum 182 and the surge duct 190. As a result, particles move from the particle separator unit 56 and are discharged with the exhaust discharge 192. Accordingly, the particle separator unit 56 is self-replenished without a need for cleaning downtime. FIG. 10 also schematically shows the orientation of the through holes 100 in the various segments 154, 162, 164, 174 and 178. This shows the incline of the through holes 100 in the segment 178 as compared to the horizontal through holes 100 in the segments 154, 162, 164 and 174 as viewed from the incoming air side, relative to the air flow stream 68, of the guide vanes 62.

Through the examples described herein, an efficient manner of removing particles from a gas flow stream is provided without passing inlet air through a barrier filter, and without a need to divert air flow from its intended purpose. The air flow stream passes through a particle separator and passes by a series of dividers with through-holes and plenums so that particles are removed from the inlet air. The collection activity of the particle collector is entirely passive and may be readily self-refreshed by a scavenging system that draws particles out and exhausts them. The particle separator has applicability wherever particle separation from a fluid stream is desired. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A particle separator comprising:
 a housing through which a flow stream is directed;
 a number of guide vanes disposed in the housing, at least one of the guide vanes having a profile wherein the flow stream is guided to follow the profile, at least one of the guide vanes having a wall structure surrounding an open interior defining a vane plenum, with a plurality of through-holes extending through the wall structure of the guide vane;

wherein first ends of the through-holes are open to the flow stream and second ends of the through-holes are open to the vane plenum;

a common plenum defined by the housing, wherein the vane plenum is open to the common plenum; and a scavenge duct connected with the common plenum and configured to discharge particles collected in the vane plenum and to self-refresh the particle separator.

2. The particle separator of claim 1, wherein:

a first subset of the through-holes is configured to direct flow from the flow stream into the vane plenum, which is configured to collect particles from the flow stream that pass through the first subset of the through-holes; and a second subset of the through-holes is configured to direct flow out of vane plenum back to the flow stream.

3. The particle separator of claim 1, wherein the flow stream travels in an upstream to downstream direction, and wherein at least some of the through-holes are inclined at an angle so that each of their respective first end is located at an upstream position relative to their respective second end.

4. The particle separator of claim 3, wherein additional of the through-holes are inclined so that their respective first end is located at a downstream position relative to their respective second end.

5. The particle separator of claim 1, wherein the guide vanes are spaced from one another at a vane pitch with zero line of sight along the flow stream.

6. The particle separator of claim 1, wherein the guide vanes each have two vane plenums separated from one another by a center wall.

7. The particle separator of claim 1, wherein the guide vanes comprise plural guide vanes with plural vanes plenums, wherein each of the plural vanes plenums is open to the common plenum.

8. The particle separator of claim 7, wherein the common plenum is connected by the scavenge duct with a scavenging system through which particles are exhausted.

9. The particle separator of claim 8, wherein the scavenging system is connected with a compressor surge duct.

10. The particle separator of claim 1, wherein each guide vane includes a bend and wherein some of the through-holes at the bend are oriented to direct particles in the vane plenum away from the wall structure.

11. The particle separator of claim 1, wherein the guide vanes comprise plural guide vanes with plural vanes plenums, wherein each of the plural vanes plenums is open to the common plenum, and comprising a compressor with a surge duct leading from the compressor to an exhaust duct, with a surge control valve disposed in the surge duct, wherein the scavenge duct is connected with the surge duct to direct the particles from the vane plenum to the exhaust duct.

12. A particle separator for an inlet duct comprising:

a housing through which a flow stream is directed;

a plurality of guide vanes disposed in the housing, each of the guide vanes having a profile wherein the flow stream is guided to follow the profile, each of the guide vanes having a wall structure surrounding an open interior defining a vane plenum, with a plurality of through-holes extending through the wall structure of the guide vane connecting the flow stream with the vane plenum, wherein first ends of the through-holes are open to the flow stream and second ends of the through-holes are open to the vane plenum;

a common plenum defined by the housing, wherein each of the vane plenums is open to the common plenum; and a scavenge duct connected with the common plenum and configured to discharge particles collected in the vane plenums and to self-refresh the particle separator.

13. The particle separator of claim 12, wherein:

a first subset of the through-holes is configured to direct flow from the flow stream into the vane plenum, which is configured to collect particles from the flow stream that pass through the first subset of the through-holes; and a second subset of the through-holes is configured to direct flow out of vane plenum back to the flow stream, improving flow into the vane plenum and assisting particle capture.

14. The particle separator of claim 13, wherein some of the first subset of through-holes are inclined more than others of the first subset of through-holes relative to the air stream, and are configured to direct particles away from the wall structure, into the vane plenum and toward the common plenum.

15. The particle separator of claim 12, wherein the guide vanes are spaced from one another at a vane pitch with zero line of sight along the flow stream so that the flow stream must turn when passing between adjacent of the guide vanes.

16. The particle separator of claim 12, wherein the guide vanes each have two vane plenums separated from one another by a center wall, wherein the center wall is solid without through-holes.

17. The particle separator of claim 12, wherein the scavenge duct is connected in a scavenging system, which is connected with a compressor surge duct.

18. The particle separator of claim 12, wherein each guide vane includes a bend and wherein some of the through-holes at the bend are oriented to direct particles in the vane plenum away from the wall structure and toward the common plenum.

19. The particle separator of claim 12, comprising a compressor with a surge duct leading from the compressor to an exhaust duct, with a surge control valve disposed in the surge duct, wherein the scavenge duct is connected with the surge duct to direct the particles from the vane plenums to the exhaust duct.

20. A particle separator for an inlet duct channeling a flow stream, the particle separator comprising:

a plurality of guide vanes aligned with one another and configured to separate the flow stream into multiple flow channels, the guide vanes each having a profile wherein the flow channels follow the profile and each flow channel has a zero line of sight so that the flow stream must turn in the flow channel, wherein each guide vane has a wall structure surrounding an open interior defining a vane plenum, with a plurality of through-holes extending through the wall structure of the guide vane connecting the flow stream with the vane plenum, wherein first ends of the plurality of through-holes are open to the flow stream and second ends of the plurality of through-holes are open to the vane plenum, wherein the flow stream travels in an upstream to downstream direction, and wherein at least some of the plurality of through-holes are inclined at an angle so that each of their respective first end is located at an upstream position relative to their respective second end.

* * * * *